United States Patent
Yoon

(10) Patent No.: US 9,028,994 B2
(45) Date of Patent: May 12, 2015

(54) BATTERY MODULE INCLUDING SENSING MEMBER PRESSED BY TERMINAL CONNECTING MEMBER

(75) Inventor: Ji-Hyoung Yoon, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 253 days.

(21) Appl. No.: 13/602,430

(22) Filed: Sep. 4, 2012

(65) Prior Publication Data

US 2013/0143085 A1 Jun. 6, 2013

(30) Foreign Application Priority Data

Dec. 1, 2011 (KR) .................. 10-2011-0127647

(51) Int. Cl.
  *H01M 6/42* (2006.01)
  *H01M 10/48* (2006.01)
  *H01M 2/04* (2006.01)
  *H01M 2/10* (2006.01)
  *H01M 2/20* (2006.01)
  *H01M 2/30* (2006.01)
(52) U.S. Cl.
  CPC .............. *H01M 2/202* (2013.01); *H01M 2/04* (2013.01); *H01M 2/1094* (2013.01); *H01M 2/30* (2013.01); *H01M 10/486* (2013.01)
(58) Field of Classification Search
  USPC .................................... 429/90, 156, 158, 160
  See application file for complete search history.

(56) References Cited

U.S. PATENT DOCUMENTS

| | | |
|---|---|---|
| 6,346,001 B1 | 2/2002 | Lu et al. |
| 2006/0091891 A1 | 5/2006 | Woo et al. |
| 2010/0073005 A1 | 3/2010 | Yano et al. |
| 2010/0215999 A1* | 8/2010 | Yoon .............................. 429/90 |
| 2012/0115015 A1* | 5/2012 | Park et al. .................... 429/159 |
| 2013/0224564 A1* | 8/2013 | Kim .............................. 429/158 |

FOREIGN PATENT DOCUMENTS

| | | |
|---|---|---|
| DE | 10-2006-046347 A1 | 4/2008 |
| EP | 1069629 A2 | 1/2001 |
| EP | 2259365 A1 | 12/2010 |

(Continued)

OTHER PUBLICATIONS

Takase et al., Machine translation of JP 2010-225449 A, Oct. 2010.*

(Continued)

*Primary Examiner* — Sean P Cullen
(74) *Attorney, Agent, or Firm* — Lee & Morse, P.C.

(57) ABSTRACT

A battery module includes at least one pair of first and second battery cells, each of the first and second battery cells including a first electrode terminal and a second electrode terminal and a first face including a first connecting portion, a terminal connecting member electrically connecting the first electrode terminal of the first battery cell and the second electrode terminal of the second battery cell, and a sensing member including a second connecting portion coupled with the first connecting portion. The first and second connecting portions are located on the first face and the terminal connecting member is in a pressure applying relationship with the first and second connecting portions. The first face may be provided by a cap plate, and the first and second electrode terminals are spaced apart at respective ends of the cap plate.

14 Claims, 10 Drawing Sheets

(56) References Cited

FOREIGN PATENT DOCUMENTS

| | | |
|---|---|---|
| JP | 09-199107 | 7/1997 |
| JP | 2010225449 A * | 10/2010 |
| KR | 1998-0053602 | 10/1998 |
| KR | 10-2001-0003229 A | 1/2001 |
| KR | 10-2006-0039377 | 5/2006 |
| WO | WO 2010/019503 A2 | 2/2010 |

OTHER PUBLICATIONS

European Office Action dated Feb. 27, 2013.

* cited by examiner

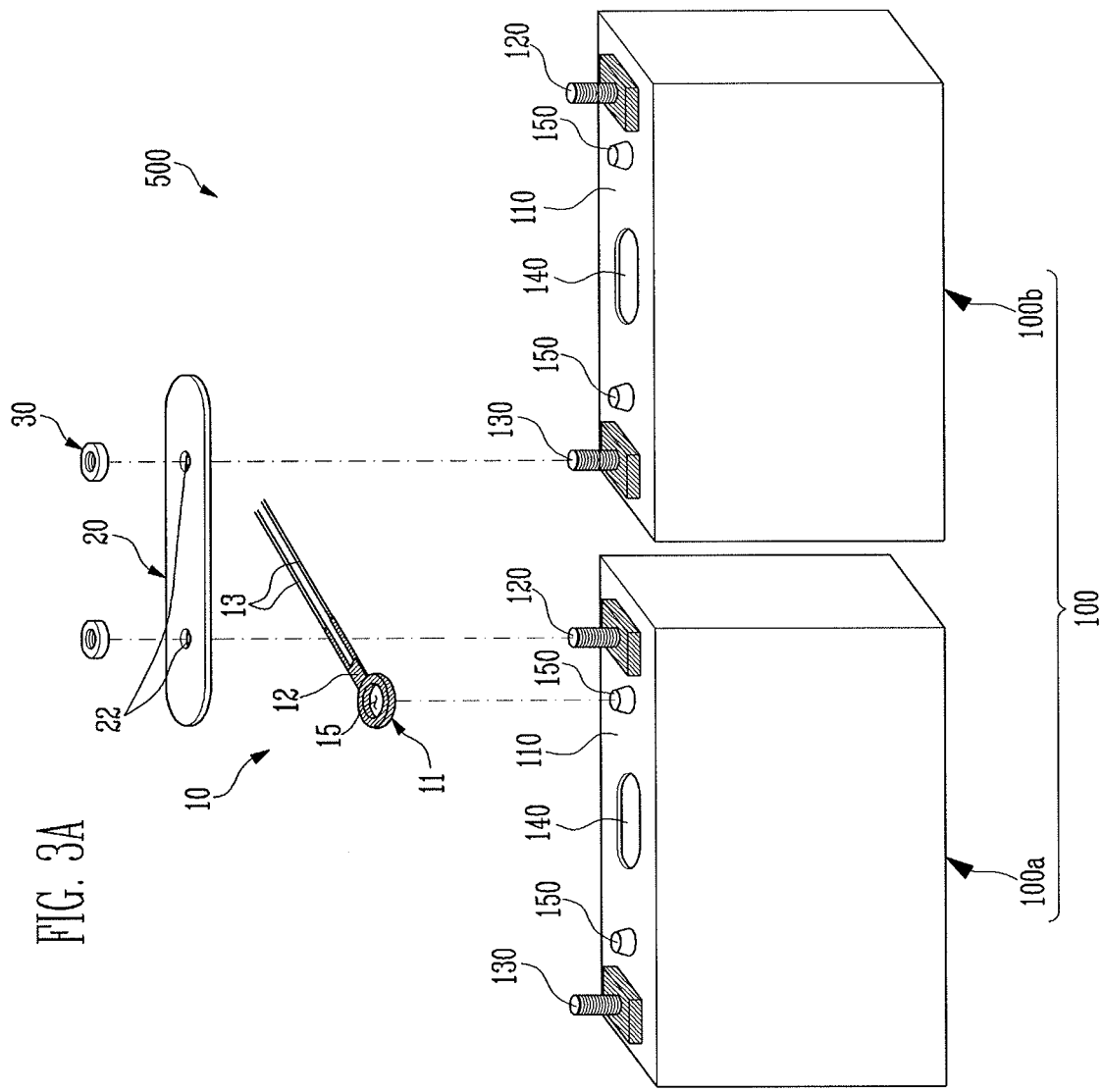

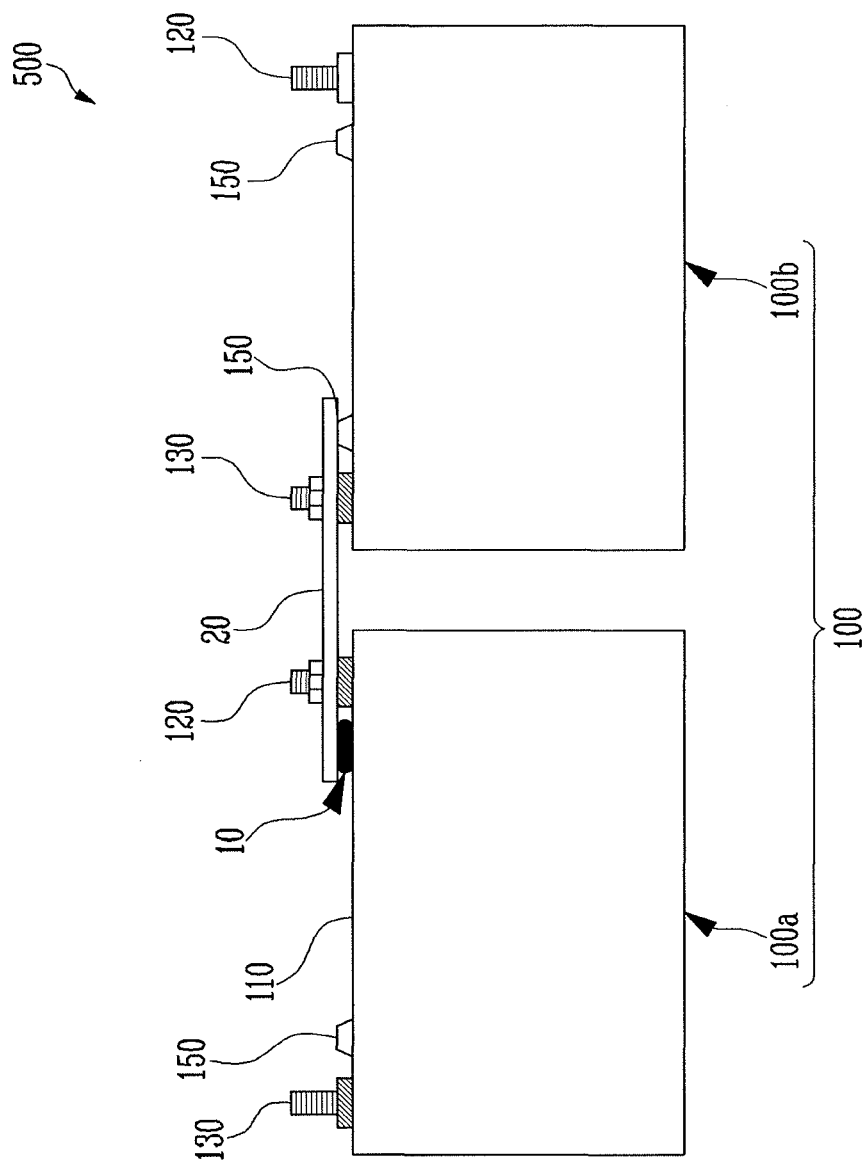

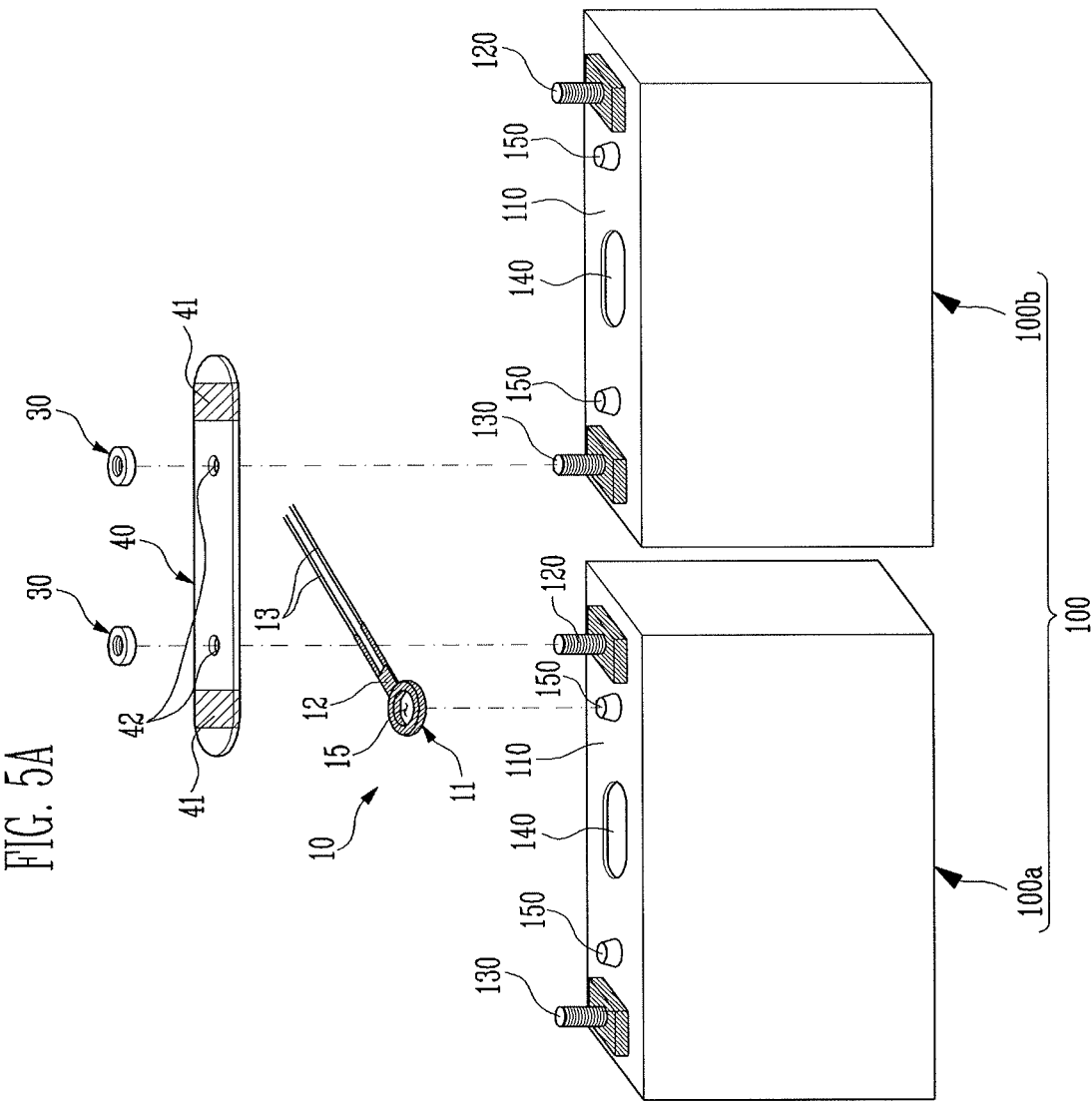

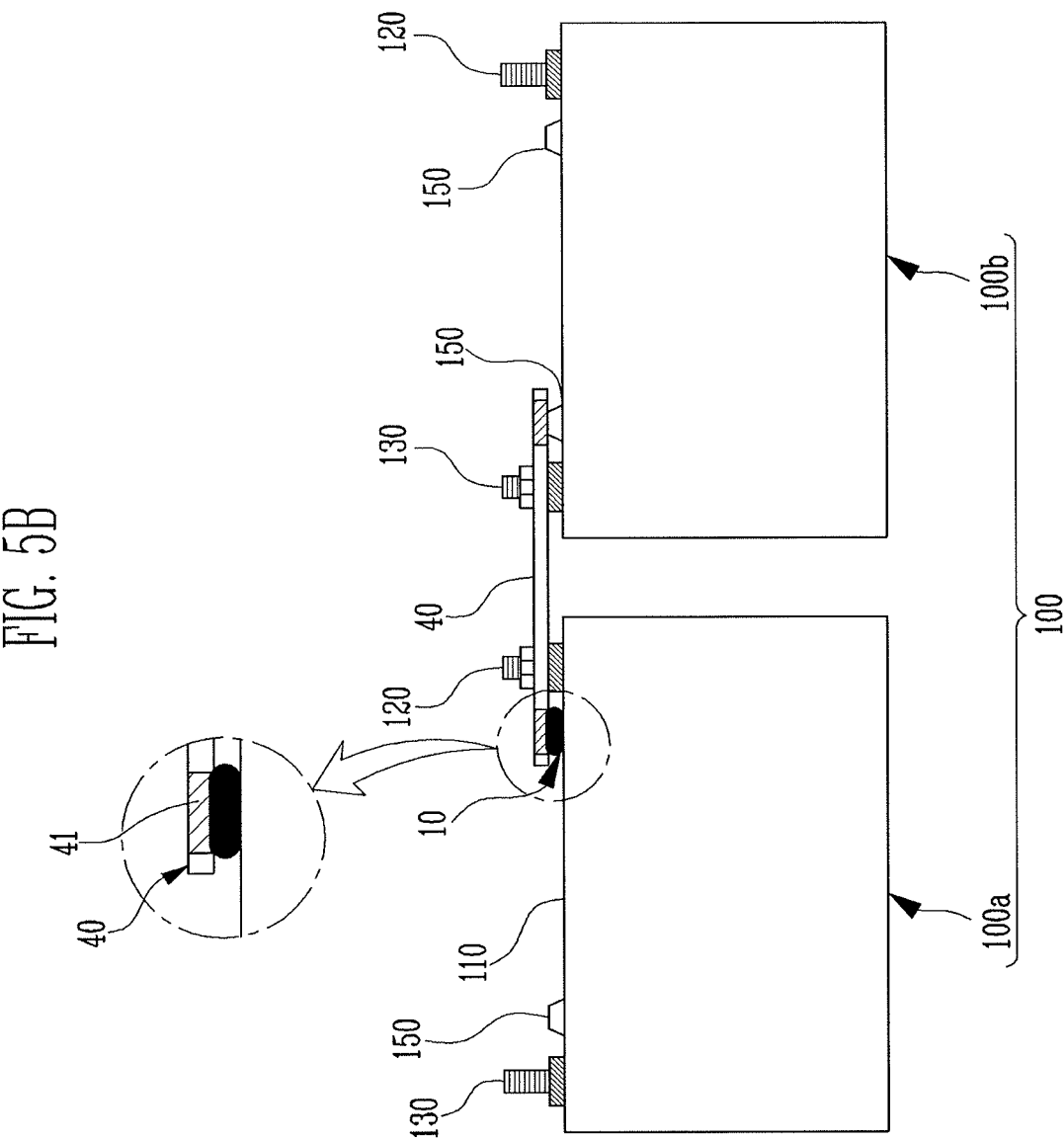

BATTERY MODULE INCLUDING SENSING MEMBER PRESSED BY TERMINAL CONNECTING MEMBER

BACKGROUND

1. Field

Embodiments relate to a battery module, and more particularly, to a battery module including a plurality of battery cells.

2. Description of the Related Art

Recently, high-power battery modules using a non-aqueous electrolyte with high energy density have been developed. The high-power battery modules have a configuration in which a plurality of battery cells are connected in series to drive the motor of devices that require high power, for example, electric vehicles, etc. to have a large capacity of the battery module.

SUMMARY

According to an aspect of the invention, there is provided a battery module including at least first and second battery cells, each including a first electrode terminal and a second electrode terminal and a first face including a first connecting portion, a terminal connecting member electrically connecting the first electrode terminal of the first battery cell and the second electrode terminal of the second battery cell, and a sensing member including a second connecting portion coupled with the first connecting portion. The first and second connecting portions are located on the first face, and the terminal connecting member is in a pressure applying relationship with the first and second connecting portions.

The first face may be provided by a cap plate. The first and second electrode terminals may be spaced apart at respective ends of the cap plate.

The first connecting portion may include at least one protrusion portion that protrudes from the first face. The second connecting portion may include an opening corresponding in shape to the protrusion portion. The protrusion portion may insertably engage the opening. The protrusion portion of the first connecting portion may engage the opening by a press-fit engagement.

The first connecting portion may have a shape in a plane parallel to the first face that is a circle or a polygon. The shape of the first connecting portion in the plane parallel to the first face may be a triangle or a quadrangle. The first connecting portion may taperingly protrude from the first face.

The first connecting portion may be in a form of an indentation in the first face.

The second connecting portion may insertably engage the indentation.

The second connecting portion may include plastic or rubber.

The first and second battery cells may be adjacent to each other. The terminal connecting member may connect the first or second electrode terminals of the first and second battery cells. The pressure applying relationship of the first and second connecting portions and the terminal connecting member may press the first and second connecting portions in a direction toward the first face.

The terminal connecting member may include a facing portion that contacts the first or second connecting portion. The facing portion may be elastic.

BRIEF DESCRIPTION OF THE DRAWINGS

Features will become apparent to those of ordinary skill in the art by describing in detail exemplary embodiments with reference to the attached drawings in which:

FIG. 3A illustrates a disassembled perspective view of a battery module.

FIG. 3B illustrates a front view of a battery module.

FIG. 5A illustrates a disassembled perspective view of a battery module according to another embodiment.

FIG. 5B illustrates a front view of the battery module and schematically illustrates first and second connecting portions.

DETAILED DESCRIPTION

Figure 1:
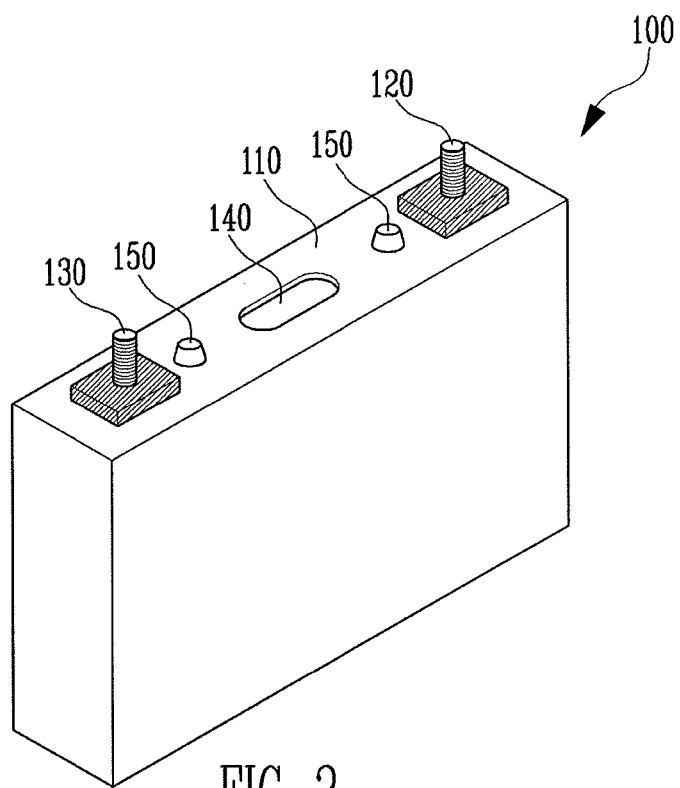
FIG. 1 illustrates a perspective view of a battery cell according to an exemplary embodiment.

Korean Patent Application No. 10-2011-0127647, filed on Dec. 1, 2011, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein.

In the drawing figures, the dimensions of layers and regions may be exaggerated for clarity of illustration. Like reference numerals refer to like elements throughout.

Figure 2:
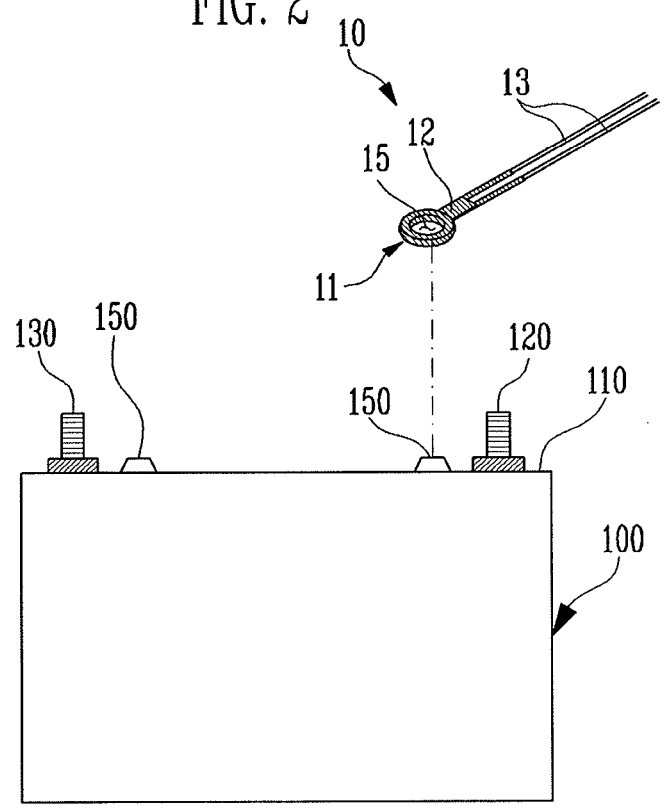
FIG. 2 illustrates a front view of the battery cell of FIG. 1 and a sensing member disassembled from the battery cell.

FIG. 1 is a perspective view of a battery cell according to an exemplary embodiment, FIG. 2 shows a front view of the battery cell of FIG. 1 and a sensing member, FIG. 3A shows a disassembled perspective view of a battery module, and FIG. 3B shows a front view of a battery module.

The battery module 500 according to an exemplary embodiment includes at least first and second battery cells 100*a*, 100*b*, each including a first face 110 provided with first and second electrode terminals 120, 130 and a first connecting portion 150; a terminal connecting member 20 electrically connecting the first electrode terminal 120 of the first battery cell 100*a* and the second electrode terminal 130 of the second battery cell 100*b*; and a sensing member 10 including a second connecting portion 11 coupled with the first connecting portion 150. The first and second connecting portions 150, 11 are provided on the first face 110 and are pressed on by the terminal connecting member 20. The first face 110 may be in the form of a cap plate. The first and second electrode terminal 120, 130 may be spaced apart from each other at respective ends of the cap plate.

Referring to FIGS. 1 and 2, the battery cell 100 includes a cell case that contains an electrode assembly, and electrolyte. The electrode assembly and the electrolyte are accommodated in the cell case to produce energy by electrochemical reactions. For example, the first face 110 may be in the form of a cap plate coupled with an opening of the cell case.

The first and second electrode terminals 120 130 may be provided at the respective ends of the first face 110. The first connecting portion 150 may be provided between the first and second electrode terminals 120, 130. The first connecting portion 150 may be coupled with the second connecting portion 11 of the sensing member 10. The first and second electrode terminals 120, 130 may be connected to the electrode assembly to transfer the energy produced in the battery cell 100 to the outside. For example, the first and second electrode terminals 120, 130 may be a cathode terminal and an anode terminal having a polarity different from each other. A vent portion 140 may act as a safety device to prevent an explosion of the battery cell 100 by discharging gas produced from the inside of the battery cell 100.

A plurality of battery cells 100 may be electrically connected to each other by the terminal connecting member 20, thereby allowing the battery module 500 to act as a power source. The terminal connecting member 20 may connect the first electrode terminal 120 of one of the battery cells 100 with the second electrode terminal 130 of another of the battery cells 100. The terminal connecting member 20 may be formed of an electrically conductive material. For example, the terminal connecting member 20 may include a bus bar. The terminal connecting member 20 may include holes 22 at positions corresponding to the first and second electrode terminals 120, 130. The first and second electrode terminals 120, 130 may penetrate the holes 22 and may be fixed to the terminal connecting member 20 by nuts 30 or similar fasteners.

The sensing member 10 may sense electrical characteristics of voltage, current and the like, and the temperature of the battery cell 100. For example, regarding temperature, the sensing member 10 may transfer temperature data of the battery cell 100 as an electrical signal to a protecting device such as a BMS (Battery Management System). The sensing member 10 may include the second connecting portion 11, a head portion 12 and a pair of lead wires 13 extending from the head portion 12. The material of the second connecting portion 11 may include a material having insulating properties, such as plastic and rubber. The material having insulating properties may prevent a short between the first or second electrode terminal 120, 130 and the first face 110 from being produced when measuring the temperature of the battery cell 100.

The head portion 12, which is the portion that measures the temperature of the battery cell 100, may include, for example, a thermistor. A thermistor is a type of resistor made of a material having a resistance that changes according to the temperature. A thermistor may prevent over current of a circuit from increasing over constant temperature, or may be used as sensor sensing the temperature of the circuit. The temperature data of the battery cell 100 as measured by the head portion 12 may be transferred to the protection device of the battery module 500 by the lead wire 13.

Referring to FIGS. 3A and 3B, the first connecting portion 150 of the battery cell 100 may be coupled with the second connecting portion 11 of the sensing member 10. The first and second connecting portions 150, 11 may be provided on the first face 110, and may be fixed by the terminal connecting member 20.

The battery module 500 may be provided by electrically connecting battery cells to each other. For example, the battery cell 100 may include first and second battery cells 100a, 100b neighboring to each other. The terminal connecting member 20 connects the first or second electrode terminals 120, 130 of the first and second battery cells 100a, 100b. The first and second connecting portions 150, 11 are pressed on in the direction facing the first face 110.

Typically, the battery cell forming the battery module heats during reversibly repeating charging and discharging. The heating may deteriorate the battery cell, and there may be a problem of safety if heat accumulates within the battery cell. For example, when the heat produced from the battery cell is not discharged, ignition or explosion and the like of the battery cell may be caused. When controlling the temperature of the battery cell, it may be difficult to accurately measure the temperature of the battery cell by a typical way, and the process efficiency may be lowered by necessitating additional work to fix the member measuring the temperature of the battery cell to the battery cell.

The battery module 500 of the present embodiment may be controlled by accurately measuring the temperature of the battery cell 100. Accordingly, the safety of the battery module 500 may be improved, and the sensing member 10 may be easily fixed to the battery cell 100, thereby to improve productivity.

In the battery module 500, the first connecting portion 150 includes at least one protruding portion that protrudes from the outside of the first face 110. The second connecting portion 11 may include an opening 15 of a type corresponding to the protruding portion. The first connecting portion 150 may be inserted into the opening 15 to be coupled with the second connecting portion 11. For example, a section of the first connecting portion 150 in the direction parallel to the first face 110 may be a circle, and the second connecting portion 11 may be in the form of a ring having a circular opening 15 in the inside thereof. The opening 15 may be provided as a type corresponding to the section of the first connecting portion 150, and the first connecting portion 150 is forcibly inserted into the opening 15.

For example, the first connecting portion 150 may protrude in a tapered manner from the first face 110 to the outside. Accordingly, when the second connecting portion 11 is attached onto the first connecting portion 150, the second connecting portion 11 is attached in a direction from a narrow portion for the section of the first connecting portion 150 to a wide portion. Therefore, the second connecting portion 11 may be easily attached to the first connecting portion 150. Further, after the first connecting portion 150 and the second connecting portion 11 are attached, the portion of the first connecting portion 150 adjacent to the first face 110, and having a wide section, may be forcibly inserted into the opening 15 of the second connecting portion 11, so that the second connection portion 11 is not shaken loose by an external force such as vibration and is stably fixed.

The first and second connecting portions 150, 11 are coupled to each other, and may be pressed on by the terminal connecting member 20 when the first and second electrode terminals 120, 130 are connected by the terminal connecting member 20. Accordingly, the temperature of the terminal connecting member 20 heated by the flow of current may be also measured, and the sensing member 10 may be stably fixed to the battery cell 100 by the terminal connecting member 20 without requiring separate processes.

The first connecting portion 150 may be provided at any one side or at both sides of the portion of the first face 110 adjacent to the first electrode terminal 120 and the second electrode terminal 130. Accordingly, it is possible to flexibly adapt to changing designs for the battery module 500 by coupling the sensing member 10 with the second connecting portion 11.

Hereinafter, in FIGS. 4A to 8, another embodiment will be described. Except for the content to be described below, description relating to content that similar to the content described in the embodiment related to FIGS. 1 to 3B will not be repeated.

Figure 4A:
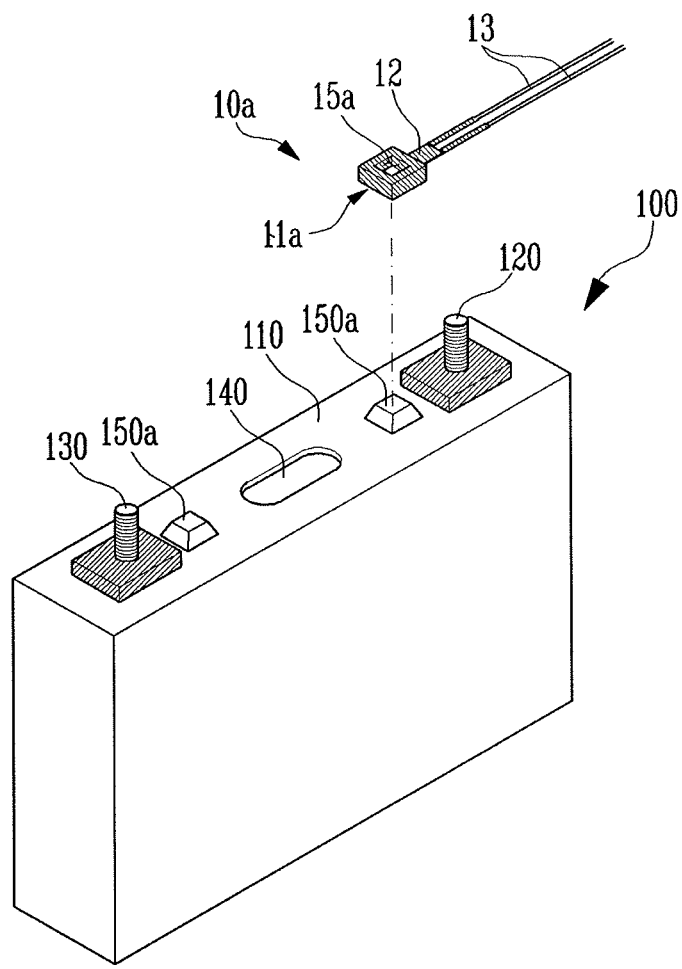
FIG. 4A illustrates a perspective view of a battery cell and a sensing member according to another embodiment.
Figure 4B:
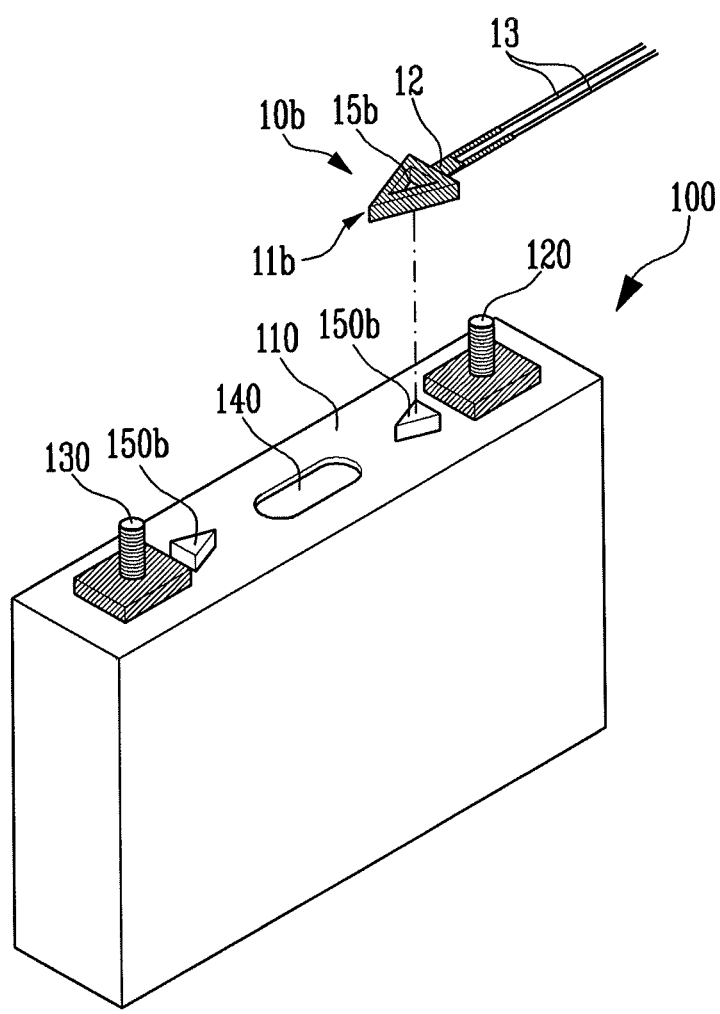
FIG. 4B illustrates a perspective view of a battery cell and a sensing member according to another embodiment.

FIGS. 4A and 4B are perspective views of the battery cell and the sensing member according to another embodiment.

Referring to FIGS. 4A and 4B, the first face 110 of the battery cells 100a, 100b is provided with the first and second electrode terminals 120, 130 and a vent 140. At least one first connecting portion 150a, 150b may be provided between the first and second electrode terminals 120, 130.

The first connecting portions 150a, 150b may protrude from the outside of the first face 110. A section of the first connecting portion 150a in the direction parallel to the first face 110, 150b may be in the form of a circle (refer to FIG. 3A), a polygon such as a triangle (FIG. 4B) or a quadrangle (FIG. 4A), or other type of geometric figure. The sensing members 10a, 10b may provide the second connecting portions 11a, 11b formed with openings 15a, 15b of a type corresponding to the first connecting portions 150a, 150b, respectively.

The first and second connecting portions 150a, 150b, 11a, 11b may be provided in various types, and also, various types may be even in one battery cell 100a, 100b. For example, if the first connecting portions 150a, 150b having a shape different from each other are provided in one battery cell 100a, 100b, it may be possible to variously provide the sensing members 10a, 10b according to the position of the battery cells 100a, 100b.

FIG. 5A is a disassembled perspective view of a battery module according to another embodiment, and FIG. 5B schematically shows first and second connecting portions.

In FIGS. 5A and 5B, the first face 110 of two battery cells 100 neighboring to each other may be provided with the first and second terminals 120, 130. The first and second terminals 120, 130 neighboring to each other may be electrically connected by the terminal connecting member 40. The first face 110 may be provided with the first connecting portion 150, and the first connecting portion 150 may be coupled with the second connecting portion 11 of the sensing member 10. The terminal connecting member 40 may press on the first and second connecting portions 150, 11 in the direction facing the first face 110.

The terminal connecting member 40 of the present embodiment may further include a facing portion 41 that contacts the first or second connecting portions 150, 11. The facing portion 41 may be formed as an elastic member. For example, the elastic member may be formed of at least any one of rubber or a spring.

The terminal connecting member 40 may include at least one hole 42, and the first and second electrode terminals 120, 130 may penetrate through the hole 42 and may be fixed by nuts 30 or other fasteners. The facing portion 41 of the terminal connecting member 40 may press on the first or second connecting portion 150, 11. The facing portion 41 formed as the elastic member has an elasticity force, and therefore, may easily press on the first or second connecting portion 150, 11. Further, when the terminal connecting member 40 is fixed to the first and second electrode terminals 120, 130, an allowable range of assembly tolerance may be widened by the elasticity force, thereby reducing an error rate of the battery module.

Figure 6:
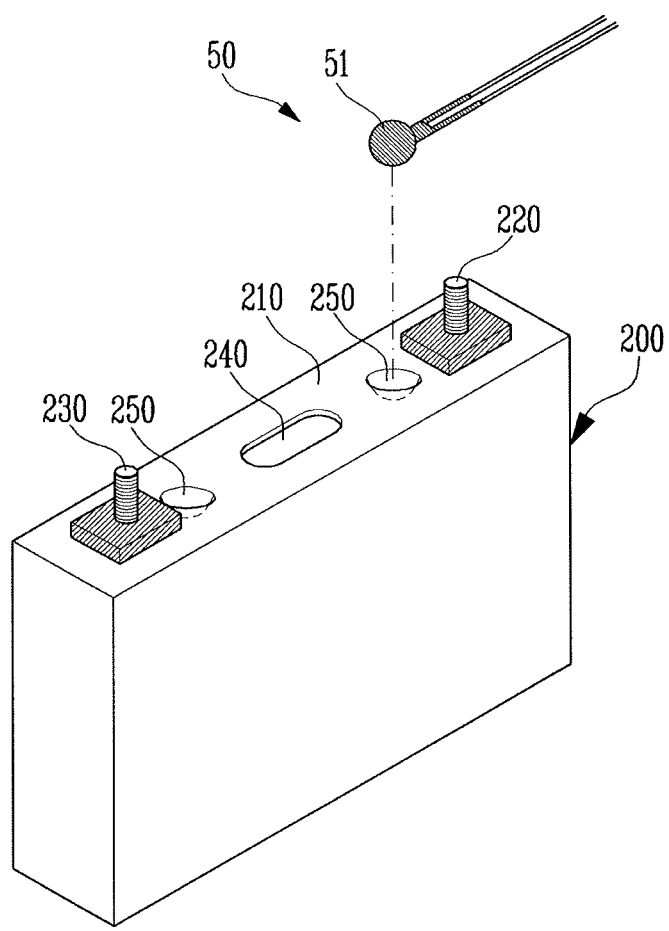
FIG. 6 illustrates a perspective view of a perspective view of a battery cell and a sensing member according to other embodiments.

FIG. 6 is a perspective view of the perspective view of the battery cell and the sensing member according to other embodiment.

In FIG. 6, the battery cell 200 may include the first and second electrode terminals 220, 230 and the vent 240 in the first face 210. Further, at least one first connecting portion 250 may be provided between the first or second electrode terminals 220, 230 and the vent 240. The first connecting portion 250 may be coupled with the second connecting portion 51 of the sensing member 50 that measures the temperature of the battery cell 200.

The first connecting portion 250 and the second connecting portion 51 may be provided as types corresponding to each other. For example, the first connecting portion 250 may be in the form of a groove or depression in the first face 110, and the second connecting portion 51 may inserted into and coupled with the groove or depression. After providing the first connecting portion 250 at a position where measurement the temperature in the battery cell 200 is desired, it is possible to provide the second connecting portion 51 of the sensing member 50 to correspond to the first connecting portion 250. The size of the second connecting portion 51 may be provided to closely fit into the first connecting portion 250, and therefore, the second connecting portion 51 may be inserted into the first connecting portion 250.

Figure 7:
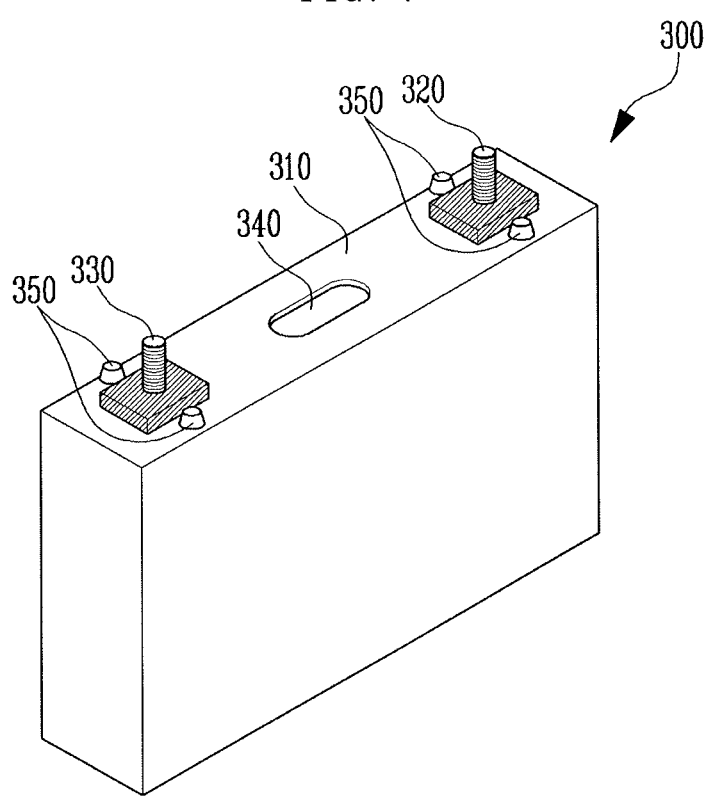
FIG. 7 illustrates a perspective view of a battery pack according to other embodiments.
Figure 8:
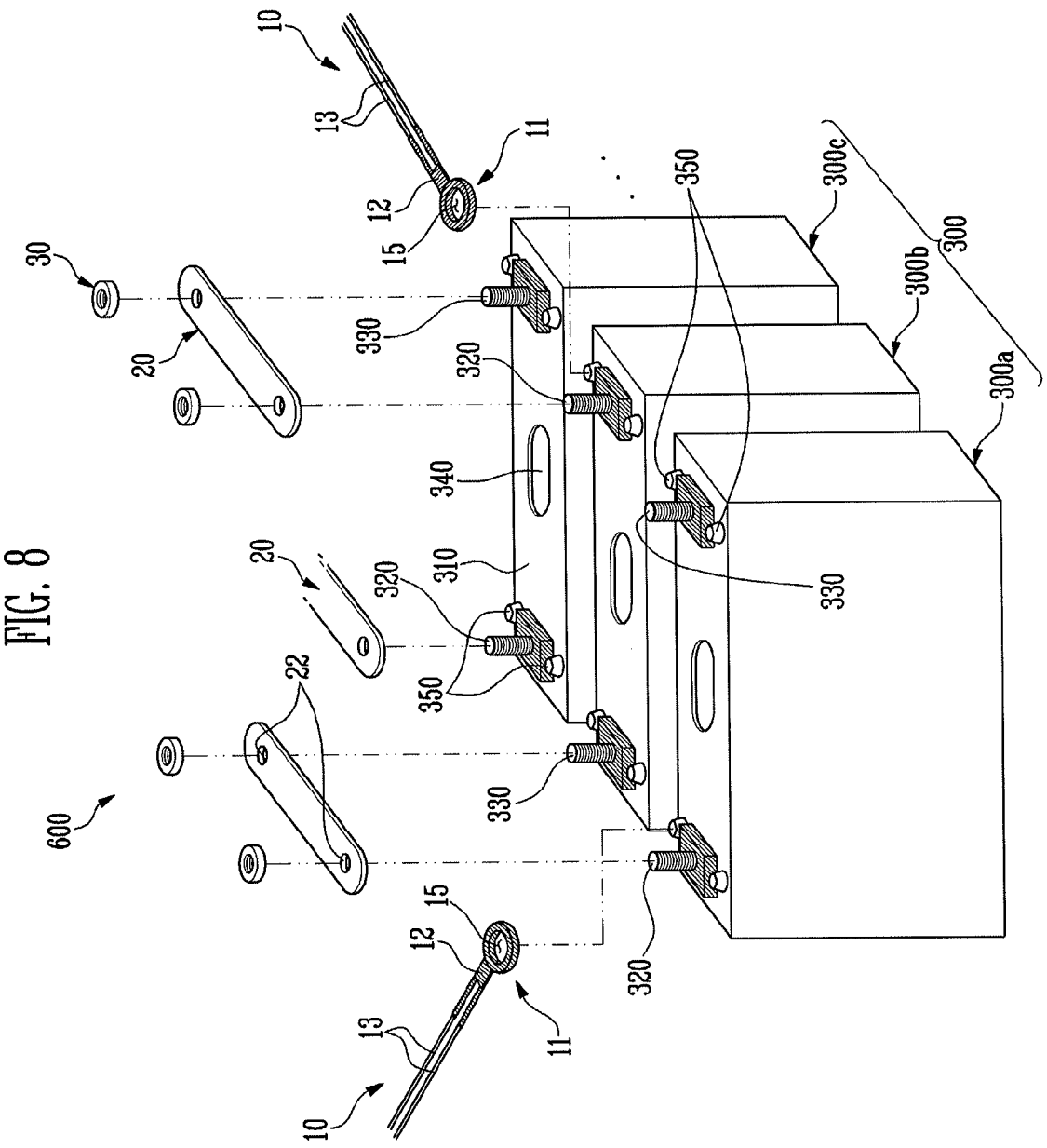
FIG. 8 illustrates a disassembled perspective view of a battery module according to other embodiments.

FIG. 7 is a perspective view of the battery cell according to another embodiment of the invention, and FIG. 8 is a disassembled perspective view of a battery module according to other embodiments of the invention.

In FIG. 7, the battery cell 300 may include the first and second electrode terminals 320, 330, the vent 340, and at least one first connecting portions 350 in the first face 310. The first connecting portion 350 may be provided adjacent to the first or second electrode terminal 320, 330. For example, one pair of the first connecting portions 350 may be positioned at both sides of the first or second electrode terminal 320,330, and may be provided to face across from each other.

In FIG. 8, in the module 600 of the present embodiment, at least one first to third battery cells 300a, 300b, 300c are aligned. The first to third battery cells 300a, 300b, 300c may be aligned to allow wide faces of the battery cells 300a, 300b, 300c to face each other. The battery cells 300a, 300b, 300c neighboring to each other may be electrically connected to each other by the terminal connecting member 20. The terminal connecting member 20 may connect the first electrode terminal 320 of the first battery cell 300a and the second electrode terminal 330 of the second battery cell 300b. The first electrode terminal 320 of the second battery cell 300b may be connected to the second electrode terminal 330 of the third battery cell 300c by the terminal connecting member 20 to connect a plurality of battery cells 300a, 300b, 300c in series.

Prior to connecting the first and second electrode terminals 320, 330 of the battery cell 300 neighboring to each other to the terminal connecting member 20, the first connecting portion 350 and the second connecting portion 11 of the sensing member 10 may be coupled. The coupled first and second connecting portions 350, 11 are pressed on by the terminal connecting member 20 in the direction facing the first face 310 of the battery cell 300.

By way of summation and review, research has been conducted to minimize risks such as ignition or explosion with respect to battery modules having a plurality of battery cells including a reactive metal. The embodiments advance the art by providing a battery module in which a state of the battery cell may be accurately measured and/or controlled, thereby improving the safety of the battery. Moreover, embodiments provide a battery module formed with battery cell having a new shape.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
   at least first and second battery cells, each including a first electrode terminal and a second electrode terminal and a first face including a first connecting portion;
   a terminal connecting member electrically connecting the first electrode terminal of the first battery cell and the second electrode terminal of the second battery cell; and
   a sensing member including a second connecting portion coupled with the first connecting portion,
   wherein the first and second connecting portions are located on the first face, and the terminal connecting member presses the first and second connecting portions against one another.

2. The battery module as claimed in claim 1, wherein:
   the first face is provided by a cap plate, and
   the first and second electrode terminals are spaced apart at respective ends of the cap plate.

3. The battery module as claimed in claim 1, wherein:
   the first connecting portion includes at least one protrusion portion that protrudes from the first face,
   the second connecting portion includes an opening corresponding in shape to the protrusion portion, and
   the protrusion portion insertably engages the opening.

4. The battery module as claimed in claim 3, wherein the protrusion portion of the first connecting portion engages the opening by a press-fit engagement.

5. The battery module as claimed in claim 3, wherein the first connecting portion taperingly protrudes from the first face.

6. The battery module as claimed in claim 3, wherein the first connecting portion has a shape in a plane parallel to the first face that is a circle or a polygon.

7. The battery module as claimed in claim 6, wherein the shape of the first connecting portion in the plane parallel to the first face is a triangle or a quadrangle.

8. The battery module as claimed in claim 1, wherein:
   the first connecting portion is in a form of an indentation in the first face, and
   the second connecting portion insertably engages the indentation.

9. The battery module as claimed in claim 1, wherein the second connecting portion includes plastic or rubber.

10. The battery module as claimed in claim 1, wherein:
    the first and second battery cells are adjacent to each other, and
    the terminal connecting member presses the first and second connecting portions in a direction toward the first face.

11. A battery module as claimed in claim 1, wherein:
    the terminal connecting member includes a facing portion that contacts the first or second connecting portion, and
    the facing portion is elastic.

12. The battery module as claimed in claim 1, wherein the first connecting portion protrudes in a tapered manner from the first face.

13. The battery module as claimed in claim 1, wherein the battery cells each includes two first connecting portions.

14. The battery module as claimed in claim 1, wherein:
    the battery cells each includes two pairs of first connecting portions;
    a first pair of first connecting portions are positioned at both sides of the first electrode terminal; and
    a second pair of first connecting portions are positioned at both sides of the second electrode terminal.

* * * * *